ELECTRONIC SHIFT REGISTER

Filed Aug. 28, 1959

*INVENTOR.*
HARVEY A DRUKER
LAURENCE R. BROWN

BY Laurence R. Brown

United States Patent Office 2,967,250
Patented Jan. 3, 1961

2,967,250

ELECTRONIC SHIFT REGISTER

Harvey A. Druker, Lansdale, and Laurence R. Brown, Berwyn, Pa., assignors to Briggs Associates, Inc., Norristown, Pa., a corporation of Pennsylvania Filed Aug. 28, 1959, Ser. No. 836,658

1 Claim. (Cl. 307—88.5)

This invention relates to electronic digital data processing circuits, and more particularly it relates to solid state electronic shift register circuits.

Various types of electronic shift register circuits have been provided in the past, but these circuits have been complex in nature where they must provide various desirable features. For example, with static magnetic shift registers, output signals are limited to dynamic pulses at the time information is destroyed. This prevents simple parallel signal output. In dynamic type of flip-flop shift registers at which D.-C. level output signals are available, complex binary counting, gating and shifting circuits have been necessary to produce proper action. In many instances high power and critical pulse lengths for shift or signal pulses are required, particularly in one stage per bit applications. Furthermore, prior art circuits have been complex in requiring several voltage levels, high standby power and many components, so that expense is high and reliability is poor because of the increased possibility of component failure or changes of conditions.

It is, therefore, an object of this invention to provide an improved electronic shift register circuit.

A further object of the invention is to provide a solid-state shift register circuit which is uncritical in operation.

Another object of the invention is to provide a simplified shift register circuit which produces D.-C. output signals.

A still further object of the invention is to provide a one stage per bit shift register circuit which is not critically responsive to data pulse lengths or shift pulse periods.

In accordance with one embodiment of the present invention therefore, there is provided a transistorized shift register circuit using one flip-flop per stored bit. Thus each shift register stage includes two transistors coupled in a flip flop arrangement and a further pulse delay circuit which is transistorized to produce operation not critical to pulse durations. The circuit operates with a single potential level for all transistor circuits, and in its static condition only requires conduction of one transistor per stage. High reliability is afforded since each shift register stage requires a minimum of active components and a single voltage level.

Figure 1:
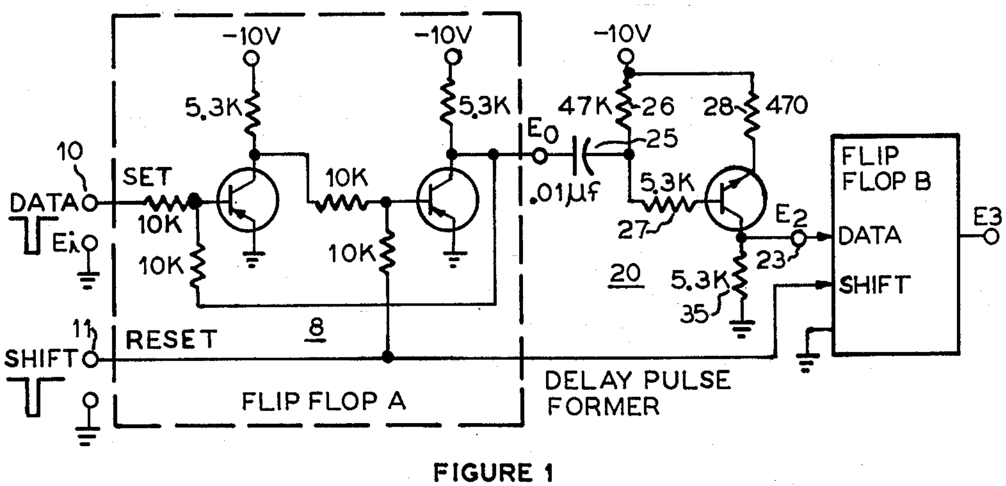
Figure 2:
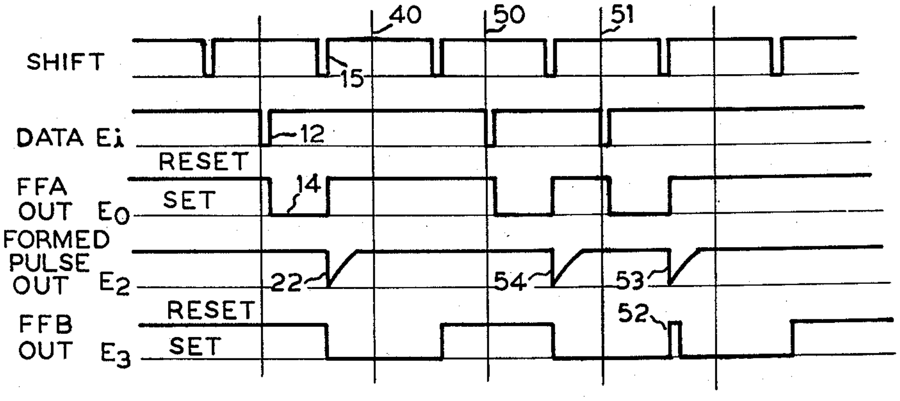
Figure 3:
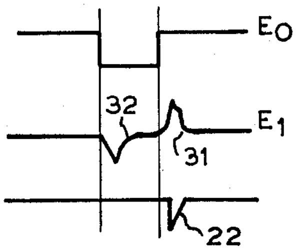

A more detailed description of the invention, its functions and advantages follows, with reference to the accompanying drawing, wherein:

Figure 1 is a schematic circuit diagram of a shift register embodiment of the invention, Figure 2 is a waveform diagram indicating the mode of operation of the illustrated embodiment, and Figure 3 is a waveform diagram indicating the mode of operation of the pulse delay action between shift register stages.

Referring now to the drawing, Figure 1 shows a section of a shift register comprising two flip-flop circuits and a delay pulse forming circuit.

The flip-flop circuits A and B are identical and are formed with two cross coupled transistor switches. Since p-n-p transistors are used, the state of the flip-flop may be set by negative going data pulses and reset by negative going shift pulses at respective terminals 10 and 11.

A series of shift and data pulses are shown in Figure 2. For shift register operation the shift and data pulses are presented during alternating time periods. The representative aperiodic series of data pulses, each arriving during the specified data period, indicates operation of the shift register under various conditions. Consider for example operation of flip-flop A, responsive to data and shift pulses. This flip-flop 8 is reset by the chain of periodic shift pulses and always resides in reset condition during the absence of data. Upon entry of a data signal such as pulse waveform 12, the flip-flop 8 is driven into set condition as shown by waveform 14. The succeeding shift pulse 15 resets flip-flop 8 again.

During transition from reset condition of flip-flop 8 to set condition, the delay pulse former network 20 provides a delayed output pulse 22 at terminal 23. This pulse, which cannot vary with shift pulse duration and energy differences or different data pulse characteristics, serves as a data input pulse to flip-flop B, where the set-reset action is repeated, responsive to data presented at terminal 23.

Operation of the delay pulse former network is described and claimed in a copending application Serial No. 836,657 of the same assignee, filed August 28, 1959, by Harvey A. Druker, for "Trailing Edge Synchronized Pulse Standardizer." Its operation in the present circuit is described herein in connection with the waveforms of Figure 3.

The initial flip-flop 8 output waveform $E_0$ is substantially a square wave, which is differentiated by capacitor 25 and resistors 26, 27 and 28 to produce waveform $E_1$. A dual time constant present during the time n-p-n transistor 30 is non conducting and conducting accounts for the difference in shape of $E_1$ waveform spikes 31 and 32. The transistor only conducts responsive to the positive going portion of waveform $E_0$. Thus, output waveform 22 is produced across resistor 35 responsive to the trailing edge of waveform $E_0$ from flip-flop A to form the data input pulse 22 at the input terminal 23 of flip-flop B.

As seen in Figure 2, this delayed and shaped data pulse 22 extends after the shift pulse 15 so that the flip-flop B is driven into the set condition after expiration of the shift pulse. Thus, at the succeeding data clock pulse time 40, the static condition of the flip-flop indicates whether a data bit is stored. Analysis of the waveforms shows that data bits provided by flip-flop B lag by one operation time period the data bits in flip-flop A, thus establishing proper shift register operation. Succeeding stages operate in the same manner responsive to positive going transitions of flip-flop B at output terminal $E_3$.

In the case two successive data bits presented as shown during clock times 50 and 51, the output flip-flop B must provide a complete set-reset transition 52 to form a transition signal for the succeeding delay pulse former circuit. Thus, the pulse delay circuit 20 provides an output pulse enough delayed in time to permit the output flip-flop B to return to reset condition responsive to the shift pulse and be driven again to set condition by the delayed data pulse 53. This permits a positive transition of flip-flop B to actuate a succeeding delay pulse former circuit to produce the signal indicating a shift of pulse 53 into the next stage while pulse 54 is retained in storage by flip-flop B. The described circuit operates in this way with the circuit values shown.

Note that simple flip-flop action is used in this shift register operation so that critical components or conditions necessary for binary counting or binary gating are not required with the static memory sections A and B of the shift register.

The flip-flops may each drive substantial loads from either side so that static direct current levels are available for the data or its complement. Output signals are thus not restricted to exact clock pulse periods or to transition operation of the flip-flops. This permits readings to be taken from all stages in parallel if desired, or permits serial output information to be sampled at any time between two successive shift pulses.

Operation of the pulse delay circuit is extremely uncritical since variations in amplitude of power voltages do not adversely affect operation, nor do variations of amplitude or duration of input signals and shift pulses. The output power is derived from the —10 v. source rather than a storage capacitor, thereby decreasing criticality of pulse times and amplitudes.

Very little power is required in the input and shift pulses, since they only require enough energy to trigger the flip-flops into self-aided transition. Likewise, the pulse forming network is in a quiescent state except during actual data shift so that negligible power is consumed. A minimum of standby power is utilized at constant average level, not changing with the amount of data stored since one transistor of each flip-flop is conducting at all times.

Analysis of the circuit shows simplicity of construction and lack of dependence upon variable characteristics of the transistors, which need only be on or off. Thus, the entire shift register operation essentially depends upon non-changeable parameters and therefore is extremely reliable.

Thus there is provided by the invention, an improvement with features of novelty defined in detail in the following claim:

We claim:

A shift register circuit comprising in combination, a transistorized flip-flop circuit having only resistive elements coupled to power and pulse sources and adapted for set and reset operation at two separate input points, in response to input voltage level changes, data signal means providing timed aperiodic input voltage level changes to one of said input points to drive said flip-flop circuit into its set condition, shift signal means for providing timed periodic input voltage level changes to the other of said input points to drive said flip-flop circuit periodically into its reset condition at time intervals alternately spaced with the times at which data signals may arrive, switching means including a differentiating circuit responsive to transition of the flip-flop circuit from said set condition into said reset condition to produce an output pulse delayed in time to extend after the flip-flop transition is complete, said switching means comprising a normally inactive transistor of complementary polarity to those in said flip-flop circuit wherein the input circuit of the switching means is coupled to receive output pulses from the differentiating circuit in such polarity to drive said inactive transistor into conduction, and a further flip-flop circuit similar in construction to the first flip-flop circuit coupled to receive the delayed output pulse for driving it into set condition and also coupled to said shift means for driving it into its reset condition responsive to shift signals, whereby data signal conditions are transferred from the first said flip-flop to the last said flip-flop responsive to said shift signals.

References Cited in the file of this patent

UNITED STATES PATENTS

| | | |
|---|---|---|
| 2,891,172 | Bruce et al. | June 16, 1959 |
| 2,906,892 | Jones | Sept. 29, 1959 |

OTHER REFERENCES

C. N. Mundy, "Transistor as Switching Devices," Automatic Telephone and Electric Journal (England), July 1956, vol. 12, No. 3, pp. 173–181.